US007114569B2

(12) United States Patent
Chatterji et al.

(10) Patent No.: US 7,114,569 B2
(45) Date of Patent: Oct. 3, 2006

(54) METHODS, CEMENT COMPOSITIONS AND SUSPENDING AGENTS THEREFOR

(75) Inventors: Jiten Chatterji, Duncan, OK (US); Roger S. Cronwell, Walters, OK (US); D. Chad Brenneis, Marlow, OK (US); Bobby J. King, Duncan, OK (US)

(73) Assignee: Halliburton Energy Service,s Inc., Duncan, OK (US)

( * ) Notice: Subject to any disclaimer, the term of this patent is extended or adjusted under 35 U.S.C. 154(b) by 200 days.

(21) Appl. No.: 10/867,478

(22) Filed: Jun. 14, 2004

(65) Prior Publication Data

US 2005/0274519 A1  Dec. 15, 2005

(51) Int. Cl.
*E21B 33/13* (2006.01)
(52) U.S. Cl. ..................... 166/292; 166/294
(58) Field of Classification Search ......... 166/292–294
See application file for complete search history.

(56) References Cited

U.S. PATENT DOCUMENTS

| | | | | |
|---|---|---|---|---|
| 3,359,225 A | 12/1967 | Weisend | ..................... | 260/29.6 |
| 4,515,635 A | 5/1985 | Rao et al. | ..................... | 106/90 |
| 4,555,269 A | 11/1985 | Rao et al. | ..................... | 106/90 |
| 4,557,763 A | 12/1985 | George et al. | ................. | 106/90 |
| 4,640,942 A | 2/1987 | Brothers | ..................... | 523/130 |
| 4,676,317 A | 6/1987 | Fry et al. | ..................... | 166/293 |
| 4,700,780 A | 10/1987 | Brothers | ..................... | 166/293 |
| 4,703,801 A | 11/1987 | Fry et al. | ..................... | 166/293 |
| 4,941,536 A | 7/1990 | Brothers et al. | ............. | 166/293 |
| 4,997,487 A | 3/1991 | Vinson et al. | ............... | 106/804 |
| 5,049,288 A | 9/1991 | Brothers et al. | .......... | 252/8.551 |
| 5,149,370 A | 9/1992 | Olaussen et al. | | |
| 5,184,680 A | 2/1993 | Totten et al. | ................ | 166/293 |
| 5,273,580 A | 12/1993 | Totten et al. | ................ | 106/724 |
| 5,278,203 A | 1/1994 | Harms | ......................... | 523/200 |
| 5,339,903 A * | 8/1994 | Eoff et al. | ................... | 166/293 |
| 5,447,197 A | 9/1995 | Rae et al. | | |
| 5,472,051 A | 12/1995 | Brothers | ..................... | 166/293 |
| 5,489,674 A | 2/1996 | Yeh | ............................. | 356/114 |
| 5,536,825 A | 7/1996 | Yeh et al. | ..................... | 536/52 |
| 5,672,203 A | 9/1997 | Chatterji et al. | ............ | 106/808 |
| 5,871,577 A | 2/1999 | Chatterji et al. | ............ | 106/808 |
| 5,996,693 A | 12/1999 | Heathman | | |
| 5,997,907 A | 12/1999 | Goswami et al. | ........... | 424/500 |
| 6,270,565 B1 | 8/2001 | Heathman | | |
| 6,387,853 B1 * | 5/2002 | Dawson et al. | ............. | 507/211 |
| 6,644,405 B1 | 11/2003 | Vijn et al. | .................. | 166/293 |

FOREIGN PATENT DOCUMENTS

EP        1223207 A1    7/2002

OTHER PUBLICATIONS

Halliburton brochure entitled "Barite Heavyweight Additive" dated 1999.
Halliburton brochure entitled "Halad®-344 Fluid-Loss Additive" dated 1998.
Halliburton brochure entitled "Halad®-413 Fluid-Loss Additive" dated 1998.
Halliburton brochure entitled "Hi-Dense® Weight Additive" dated 1998.
Halliburton brochure entitled "HR®-25 Cement Retarder" dated 1999.
Halliburton brochure entitled "MICROMAX Weight Additive" dated 1999.
Halliburton brochure entitled "MICROSAND Cement Additive" dated 1999.
Halliburton brochure entitled "SCR-100 Cement Retarder" dated 1999.
Halliburton brochure entitled "SSA-1 Strength~ Stabilizing Agent" dated 1998.
Halliburton brochure entitled "SSA-2 Coarse Silica Flour" dated 1999.
Foreign communication from a related counterpart application dated Oct. 26, 2005.

* cited by examiner

*Primary Examiner*—Frank Tsay
(74) *Attorney, Agent, or Firm*—Craig W. Roddy; Baker Botts L.L.P.

(57) ABSTRACT

The present invention includes methods of cementing, cement compositions and a suspending agent comprising boron treated low molecular weight dry ground guar splits. A cement composition of the invention comprises hydraulic cement, water and a boron treated low molecular weight dry ground guar splits suspending agent. A method of cementing comprising the steps of preparing a cement composition that comprises hydraulic cement, water and a suspending agent comprising boron treated low molecular weight dry ground guar splits; placing the cement composition in a location to be cemented; and allowing the cement composition to set.

95 Claims, No Drawings

METHODS, CEMENT COMPOSITIONS AND SUSPENDING AGENTS THEREFOR

BACKGROUND OF THE INVENTION

1. Field of the Invention

The present invention generally relates to suspending agents, cement compositions and methods of cementing, and more particularly, to cement compositions which do not settle when exposed to high temperatures and high pressures.

2. Description of the Prior Art

Hydraulic cement compositions are commonly utilized in forming structures above and below ground. In forming such structures, a hydraulic cement composition is pumped into a form or other location to be cemented and allowed to set therein. Generally, the cement composition must not settle and separate prior to setting.

In the construction and repair of wells such as oil and gas wells, hydraulic cement compositions are pumped into locations in the wells to be cemented and allowed to set. In primary well cementing, a hydraulic cement composition is pumped into the annular space between the walls of the well bore and the exterior surfaces of a pipe string disposed therein. The cement composition is permitted to set in the annular space thereby forming an annular sheath of hardened substantially impermeable cement therein. The cement sheath physically supports and positions the pipe string in the well bore and bonds the exterior surfaces of the pipe string to the walls of the well bore whereby the undesirable migration of fluids between zones or formations penetrated by the well bore is prevented.

In the primary cementing of high temperature and high pressure wells, hydraulic cement compositions are exposed to the high temperatures and pressures during pumping for long periods of time and as a result, the cement compositions often become thin and the heavier components of the compositions settle and separate whereby the set cement has density variations therein and lacks the high strength required. As a result, significant portions of the cement sheath in the annulus between the pipe string and the walls of the well bore do not bond to the pipe string or the walls thereby bringing about leakage and/or blowouts.

Thus, there are needs for improved methods and cement compositions whereby the cement compositions do not settle and do not fail to bond to adjacent surfaces.

SUMMARY OF THE INVENTION

The present invention provides improved methods, cement compositions and a suspending agent for the compositions which meet the needs described above and overcome the deficiencies of the prior art.

A method of cementing of this invention comprises the steps of preparing a cement composition comprising hydraulic cement, water and a suspending agent comprising boron treated low molecular weight dry ground guar splits; placing the cement composition in a location to be cemented; and allowing the cement composition to set.

Another method of cementing of this invention comprises the steps of preparing a cement composition comprising hydraulic cement, optionally a strength retrogration preventer, weighting material, a fluid loss additive, a dispersant, a set retarder, water, and a suspending agent comprising boron treated low molecular weight dry ground guar splits; placing the cement composition in a location to be cemented; and allowing the cement composition to set.

Yet another method of cementing of this invention comprises the steps of preparing a heavy weight cement composition comprising Portland cement, crystalline silica strength retrogration preventer, iron oxide or manganese oxide weighting material, sodium chloride weighting material, a graft lignite copolymer fluid loss additive, a dispersant comprising a sulfonated acetone-formaldehyde condensate or the sodium salt of naphthalene sulfonate condensed with formaldehyde, a copolymer of acrylic acid and 2-acrylamido-2-methyl propane sulfonic acid set retarder, a tartaric acid set retarder, sufficient water to form a slurry, and a suspending agent comprising boron treated low molecular weight dry ground guar splits; pumping the heavy weight cement composition into the annular space between a well bore and a pipe string disposed therein; and allowing the cement composition to set therein.

A cement composition of this invention comprises hydraulic cement, water and a suspending agent comprising boron treated low molecular weight dry ground guar splits.

Another cement composition of this invention comprises hydraulic cement, optionally a strength retrogration preventer, weighting material, a fluid loss additive, a dispersant, a set retarder, water, and a suspending agent comprising boron treated low molecular weight dry ground guar splits.

Yet another heavy weight cement composition of this invention comprises Portland cement, crystalline silica strength retrogration preventer, iron oxide or manganese oxide weighting material, sodium chloride weighting material, a graft lignite copolymer fluid loss additive, a dispersant comprising a sulfonated acetone-formaldehyde condensate or the sodium salt of naphthalene sulfonate condensed with formaldehyde, a copolymer of acrylic acid and 2-acrylamido-2-methyl propane sulfonic acid set retarder, a tartaric acid set retarder, sufficient water to form a slurry, and a suspending agent comprising boron treated low molecular weight dry ground guar splits.

A suspending agent of this invention comprises boron treated low molecular weight dry ground splits. A cement composition suspending agent of this invention comprises boron treated low molecular weight dry ground splits.

The objects, features and advantages of the present invention will be readily apparent to those skilled in the art upon a reading of the description of preferred embodiments which follows.

DESCRIPTION OF PREFERRED EMBODIMENTS

The present invention provides improved methods of cementing, improved cement compositions and a suspending agent for the compositions.

A method of cementing of this invention comprises the steps of preparing a cement composition comprising hydraulic cement, water and a suspending agent comprising boron treated low molecular weight dry ground guar splits. The cement composition is placed in a location to be cemented and then allowed to set.

Another method of cementing of this invention comprises the following steps. A cement composition is prepared comprising hydraulic cement, optionally a strength retrogration preventer, weighting material, a fluid loss additive, a dispersant, set retarder and water. In addition, a suspending agent comprising boron treated low molecular weight dry ground guar splits is included in the cement composition. The cement composition is placed in a location to be cemented and then allowed to set.

Yet another method of cementing comprises the following steps. A heavy weight cement composition is prepared comprising Portland cement, crystalline silica strength retrogration preventer, iron oxide or manganese oxide weighting material, sodium chloride weighting material, a graft lignite copolymer fluid loss additive, a dispersant comprising a sulfonated acetone-formaldehyde condensate or the sodium salt of naphthalene sulfonate condensed with formaldehyde, a copolymer of acrylic acid and 2-acrylamido-2-methyl propane sulfonic acid set retarder, a tartaric acid set retarder, sufficient water to form a slurry, and a suspending agent comprising boron treated low molecular weight dry ground guar splits. The heavy weight cement composition is pumped into the annular space between a well bore and a pipe string disposed therein and the cement composition is allowed to set therein.

A cement composition of this invention comprises hydraulic cement, water and a suspending agent comprising boron treated low molecular weight dry ground guar splits.

Another cement composition of this invention comprises hydraulic cement, optionally a strength retrogration preventer, weighting material, a fluid loss additive, a dispersant, a set retarder, water and a suspending agent comprising boron treated low molecular weight dry ground guar splits.

Yet another heavy weight cement composition of this invention comprises Portland cement, a crystalline silica strength retrogration preventer, iron oxide or manganese oxide weighting material, sodium chloride weighting material, a graft lignite copolymer fluid loss additive, a dispersant comprising a sulfonated acetone-formaldehyde condensate or the sodium salt of naphthalene sulfonate condensed with formaldehyde, a copolymer of acrylic acid and 2-acrylamido-2-methyl propane sulfonic acid set retarder, a tartaric acid set retarder, sufficient water to form a slurry, and a suspending agent comprising boron treated low molecular weight dry ground guar splits.

A variety of hydraulic cements can be utilized in accordance with the present invention including those comprised of calcium, aluminum, silicone, oxygen and/or sulfur which set and harden by reaction with water. Such hydraulic cements include Portland cements, pozzolana cements, gypsum cements, alumina cements, silica cements and alkaline cements. Portland cements are generally preferred for use in accordance with the present invention. Portland cements of the types defined and described in *API Specification for Materials and Testing for Well Cements,* API Specification 10B, 22$^{nd}$ Edition, dated Dec. 1, 1997 of the American Petroleum Institute are particularly suitable. Preferred API Portland cements include Classes A, B, C, G and H with API Classes G and H being more preferred and Class G being the most preferred.

The crystalline silica strength retrogration preventer functions to prevent the cement composition when first set at a temperature above about 200° F. from losing strength and increasing in permeability. When included, the crystalline silica is added to the cement composition in an amount in the range of from about 35% to about 70% by weight of the cement therein.

The weighting material can be, but is not limited to, iron oxide or manganese oxide or sodium chloride. Preferably, the weighting material in the cement composition includes both iron oxide or manganese oxide and sodium chloride. When included, the iron oxide or manganese oxide weighting material is present in the composition in an amount in the range of from about 35% to about 60% by weight of cement therein. When included, the sodium chloride weighting material is present in the composition in an amount in the range of from about 15% to about 25% by weight of cement therein.

The fluid loss additive can be, but is not limited to, a graft lignin or lignite copolymer. Generally, a graft lignite copolymer is preferred. When included, the fluid loss additive is present in the cement composition in an amount in the range of from about 0.5% to about 2% by weight of cement therein.

The dispersant in the cement composition can be, but is not limited to, a sulfonated acetone-formaldehyde condensate or the sodium salt of naphthalene sulfonate condensed with formaldehyde. Of these, a sulfonated acetone-formaldehyde condensate is preferred. When included, the dispersant is present in the composition in an amount in the range of from about 0.25% to about 5% by weight of cement therein.

The set retarder in the cement composition can include, but is not limited to, a copolymer of acrylic acid and 2-acrylamido-2-methyl propane sulfonic acid ("AMPS®") or tartaric acid. Preferably, the cement composition includes both a copolymer of acrylic acid and 2-acrylamido-2-methyl propane sulfonic acid and tartaric acid. When included, the copolymer of acrylic acid and 2-acrylamido-2-methyl propane sulfonic acid is present in the composition in an amount in the range of from about 0.1% to about 2% by weight of cement therein. When included, the tartaric acid set retarder is present in the composition in an amount in the range of from about 0.1% to about 0.75% by weight of cement therein.

The water in the cement composition can be fresh water or salt water and is present in an amount sufficient to form a slurry, i.e., in an amount in the range of from about 30% to about 70% by weight of hydraulic cement in the composition.

The boron treated low molecular weight dry ground guar splits suspending agent is made by subjecting guar splits to dry grinding using a hammer mill. The resulting guar has a molecular weight of from about 700 to about 500 and a viscosity in a 1% by weight aqueous solution of about 20 to 30 centipoises. In order to delay the hydration of the guar until the temperature reaches about 200° F., the low molecular weight guar is dissolved in water containing sodium tetraborate decahydrate. The solution is vigorously agitated followed by the addition of methanol. Thereafter, the resulting boron treated guar is filtered and washed with methanol and then dried in a vacuum oven.

The boron treated low molecular weight dry ground guar splits suspending agent is included in the cement composition in an amount in the range of from about 0.1% to about 0.25% by weight of cement therein.

A method of cementing comprises the steps of: preparing a cement composition comprising hydraulic cement, water and a suspending agent comprising boron treated low molecular weight dry ground guar splits; placing the cement composition in a location to be cemented; and allowing the cement composition to set.

Another method of cementing comprises the steps of: preparing a cement composition comprising hydraulic cement, optionally a strength retrogration preventer, weighting material, a fluid loss additive, a dispersant, a set retarder, water, and a suspending agent comprising boron treated low molecular weight dry ground guar splits; placing the cement composition in a location to be cemented; and allowing the cement composition to set.

Yet another method of cementing comprises the steps of: preparing a heavy weight cement composition comprising Portland cement, a crystalline silica strength retrogration preventer, iron oxide or manganese oxide weighting material, sodium chloride weighting material, a graft lignite copolymer fluid loss additive, a dispersant comprising sulfonated acetone-formaldehyde condensate or the sodium salt of naphthalene sulfonate condensed with formaldehyde, a copolymer of acrylic acid and 2-acrylamido-2-methyl propane sulfonic acid set retarder, a tartaric acid set retarder, sufficient water to form a slurry, and a suspending agent comprising boron treated low molecular weight dry ground guar splits; pumping the heavy weight cement composition in the annular space between a well bore and a pipe string disposed therein; and allowing the cement composition to set therein.

A cement composition comprises: hydraulic cement; water; and a suspending agent comprising boron treated low molecular weight dry ground guar splits.

Another cement composition comprises: hydraulic cement; optionally a strength retrogration preventer; weighting material; a fluid loss additive; a dispersant; a set retarder; water; and a suspending agent comprising boron treated low molecular weight dry ground guar splits.

Yet another heavy weight cement composition of this invention comprises: Portland cement; crystalline silica strength retrogration preventer; iron oxide or manganese oxide weighting material; sodium chloride weighting material; a graft lignite copolymer fluid loss additive; a dispersant comprising a sulfonated acetone-formaldehyde condensate or the sodium salt of naphthalene sulfonate condensed with formaldehyde; a copolymer of acrylic acid and 2-acrylamido-2-methyl propane sulfonic acid set retarder; a tartaric acid set retarder; sufficient water to form a slurry; and a suspending agent comprising born treated low molecular weight dry ground guar splits.

A suspending agent of this invention comprises boron treated low molecular weight dry ground splits. A cement composition suspending agent of this invention comprises boron treated low molecular weight dry ground splits.

In order to further illustrate the methods of cementing, cement compositions and suspending agent of this invention, the following example is given.

EXAMPLE

Test cement compositions were prepared in a Warning blender. The dry components used were dry blended first and the liquid components were premixed with the water used and placed in the blender. The preblended dry components were then introduced into the blender and the components were mixed on high speed for 35 seconds.

The cement compositions were tested for suspension properties at 210° F. and at 375° F. using a High Temperature-High Pressure (HTHP) consistometer in accordance with the following solids settling test procedure.

The solids settling test results are qualitative "pass or fail" rather than quantitative. The procedure is used to characterize solids segregation under simulated high temperature downhole well conditions. A cement slurry is prepared according to procedures outlined in API Specification 10; *Specification for Materials and Testing for Well Cements.* The initial cement slurry viscosity (Bc-Bearden units of consistency) is noted and the slurry is heated to the test temperature (BHCT-bottomhole circulating temperature) and pressure in an HTHP consistometer using a well simulation thickening time testing schedule.

Upon reaching the test temperature and pressure, the slurry viscosity (Bc) is recorded and the slurry cup drive motor is turned off for 10 minutes. At the completion of the 10 minutes static period, the drive motor is turned back on and the maximum viscosity (Bc) is recorded at the instant movement is started. If the paddle drive shear pin breaks, the test is terminated. After cooling to 194° F., the slurry is examined.

In the event the shear pin remains intact, the cement slurry is stirred 50 minutes. At the end of the 50 minute period, the viscosity (Bc) is recorded and the 10 minute static period is repeated. The test procedure includes three 10 minute static intervals alternating with two 50 minute stirring periods. At the conclusion of the last 10 minute static period after the maximum viscosity (Bc) is recorded, the consistometer motor drive and heater units are turned off and the cement slurry is quickly cooled to 194° F.

Upon reaching 194° F., the slurry cup containing the cement slurry is removed from the consistometer. The slurry cup is kept upright and the cement slurry examined and a description recorded. A cement composition failure is one which exhibits major solids settling, wide differences in deflection viscosity at the end of the static periods, or one in which the shear pin for the paddle drive shears or breaks.

The cement compositions which were prepared and the results of the tests are given in the Tables below.

TABLE I

Composition Components and Amounts

| Composition Number | Portland Cement | Water, gal/sk | Crystalline Silica, % by wt. of cement | Iron Oxide, lb/sk | Sodium Chloride, lb/sk | Graft Lignite Copolymer, % by wt. of cement | Sulfonated Acetone-Formaldehyde Condensate, % by wt of cement | Sodium Salt of Naphthalene Sulfonate Condensed With Formaldehyde, % by wt. of cement | Copolymer of acrylic Acid and "AMPS ®", % by wt. of cement | Tartaric Acid, % by wt of cement | Boron Treated Low Molecular Wt. Dry Ground Guar Splits, % by wt of cement | Density, lb/gal |
|---|---|---|---|---|---|---|---|---|---|---|---|---|
| 1 | Class H | 5.7 | 40 | 36.4 | 17.36 | 0.75 | 1.0 | — | 0.75 | 0.3 | 0 | 18.57 |
| 2 | Class H | 5.7 | 40 | 36.4 | 17.36 | 0.75 | 1.0 | — | 0.75 | 0.3 | 1 | 18.13 |
| 3 | Class H | 7.5 | 40 | 36.4 | 17.36 | 0.75 | 1.2 | — | 0.75 | 0.3 | 0.5 | 17.23 |
| 4 | Class H | 7.5 | 40 | 36.4 | 17.36 | 0.75 | 1.2 | — | 0.75 | 0.3 | 1.0 | 17.21 |
| 5 | Class H | 5.7 | 40 | 36.4 | 17.36 | 0.75 | 1.0 | — | 0.75 | 0.3 | 0.5 | 18.13 |
| 6 | Class H | 5.7 | 40 | 36.4 | 17.36 | 0.75 | 1.0 | — | 0.75 | 0.3 | 0.75 | 18.12 |
| 7 | Class H | 5.7 | 40 | 36.4 | 17.36 | 0.75 | 1.0 | — | 1.0 | 0.5 | 1.0 | 18.1 |

TABLE I-continued

Composition Components and Amounts

| Composition Number | Portland Cement | Water, gal/sk | Crystalline Silica, % by wt. of cement | Iron Oxide, lb/sk | Sodium Chloride, lb/sk | Graft Lignite Copolymer, % by wt. of cement | Sulfonated Acetone-Formaldehyde Condensate, % by wt of cement | Sodium Salt of Naphthalene Sulfonate Condensed With Formaldehyde, % by wt. of cement | Copolymer of acrylic Acid and "AMPS ®", % by wt. of cement | Tartaric Acid, % by wt of cement | Boron Treated Low Molecular Wt. Dry Ground Guar Splits, % by wt of cement | Density, lb/gal |
|---|---|---|---|---|---|---|---|---|---|---|---|---|
| 8 | Class G | 5.77 | 35 | 36.4 | 17.36 | 1.6 | — | 3 | 2.0 | 2.0 | 0.35 | 19.19 |
| 9 | Class G | 5.77 | 35 | 36.4 | 17.36 | 1.6 | — | 3 | 2.0 | 2.0 | 0.5 | 19.19 |

TABLE II

Test Temperatures, Viscosities and Results

| Composition No. | Test Temperature, °F. | Initial Viscosity, Bc | Hydration Viscosity, Bc | Test Results, Pass or Fail |
|---|---|---|---|---|
| 1 | 350 | 30 | — | Fail |
| 2 | 350 | 44 | 64 | Pass |
| 3 | 350 | 24 | 28 | Pass[1] |
| 4 | 350 | 12 | 38 | Pass[1] |
| 5 | 350 | 30 | 24 | Pass |
| 6 | 350 | 32 | 40 | Pass |
| 7 | 350 | 37 | 106 | Pass |
| 8 | 350 | 42 | 38 | Pass |
| 9 | 350 | 62 | 68 | Pass |

[1]Pin sheared the third time drive motor turned on.

From the Tables I and II, it can be seen that the cement compositions of this invention passed the settling tests.

Thus, the present invention is well adapted to carry out the objects and advantages mentioned as well as those which are inherent therein. While numerous changes may be made by those skilled in the art, such changes are encompassed within the spirit of this invention as defined by the appended claims.

What is claimed is:

1. A method of cementing comprising the steps of:
preparing a cement composition that comprises hydraulic cement, water and a suspending agent comprising boron treated low molecular weight dry ground guar splits;
placing the cement composition in a location to be cemented; and
allowing the cement composition to set.

2. The method of claim 1 wherein the hydraulic cement is Portland cement, pozzolana cement, gypsum cement, alumina cement, silica cement or high alkalinity cement.

3. The method of claim 1 wherein the hydraulic cement is Portland cement.

4. The method of claim 1 wherein the water is fresh water or salt water.

5. The method of claim 1 wherein the water is present in an amount sufficient to form a slurry.

6. The method of claim 1 wherein the boron treated low molecular weight dry ground guar splits suspending agent has a molecular weight in the range of from about 500 to about 700.

7. The method of claim 1 wherein the boron treated low molecular weight dry ground guar splits suspending agent has a viscosity in a 1% by weight aqueous solution of about 20 to 30 centipoises.

8. The method of claim 1 wherein the boron treated low molecular weight dry ground guar splits suspending agent is present in the composition in an amount in the range of from about 0.1% to about 0.25% by weight of cement therein.

9. The method of claim 1 wherein the boron treated low molecular weight dry ground guar splits suspending agent when added to water does not hydrate until a temperature of about 200° F. is reached.

10. The method of claim 1 wherein the composition comprises at least one of a strength retrogression preventer, a weighting material, a fluid loss additive, a dispersant, and a set retarder.

11. A method of cementing comprising the steps of:
preparing a cement composition that comprises hydraulic cement, optionally a strength retrogression preventer, weighting material, a fluid loss additive, a dispersant, a set retarder, water, and a suspending agent comprising boron treated low molecular weight dry ground guar splits;
placing the cement composition in a location to be cemented; and
allowing the cement composition to set.

12. The method of claim 11 wherein the hydraulic cement is Portland cement, pozzolana cement, gypsum cement, aluminum cement, silica cement or high alkalinity cement.

13. The method of claim 11 wherein the hydraulic cement is Portland cement.

14. The method of claim 11 wherein the optional strength retrogration preventer is crystalline silica.

15. The method of claim 11 wherein when included the strength retrogration preventer is present in the composition in an amount in the range of from about 35% to about 70% by weight of cement therein.

16. The method of claim 11 wherein the weighting material is iron oxide, manganese oxide or sodium chloride.

17. The method of claim 11 wherein the weighting material is iron oxide or manganese oxide and sodium chloride.

18. The method of claim 17 wherein the iron oxide or manganese oxide weighting material is present in the composition in an amount in the range of from about 35% to about 60% by weight of cement therein.

19. The method of claim 17 wherein the sodium chloride weighting material is present in the composition in an amount in the range of from about 15% to about 25% by weight of cement therein.

20. The method of claim 11 wherein the fluid loss additive is a graft lignin or lignite copolymer.

21. The method of claim 11 wherein the fluid loss additive is a graft lignite copolymer.

22. The method of claim 11 wherein the fluid loss additive is present in the composition in an amount in the range of from about 0.5% to about 2% by weight of cement therein.

23. The method of claim 11 wherein the dispersant is a sulfonated acetone-formaldehyde condensate or the sodium salt of naphthalene sulfonate condensed with formaldehyde.

24. The method of claim 11 wherein the dispersant is a sulfonated acetone-formaldehyde condensate.

25. The method of claim 11 wherein the dispersant is present in the composition in an amount in the range of from about 0.25% to about 5% by weight of cement therein.

26. The method of claim 11 wherein the set retarder is a copolymer of acrylic acid and 2-acrylamido-2-methyl propane sulfonic acid.

27. The method of claim 26 wherein the copolymer of acrylic acid and 2-acrylamido-2-methyl propane sulfonic acid set retarder is present in the composition in an amount in the range of from about 0.1% to about 2% by weight of cement therein.

28. The method of claim 11 wherein the set retarder is tartaric acid.

29. The method of claim 28 wherein the tartaric acid set retarder is present in the composition in an amount in the range of from about 0.1% to about 0.75% by weight of cement therein.

30. The method of claim 11 wherein the water is fresh water or salt water.

31. The method of claim 11 wherein the water is present in an amount sufficient to form a slurry.

32. The method of claim 11 wherein the boron treated low molecular weight dry ground guar splits suspending agent has a molecular weight in the range of from about 500 to about 700 and a viscosity in a 1% by weight aqueous solution of about 20 to 30 centipoises.

33. The method of claim 11 wherein the boron treated low molecular weight dry ground guar splits suspending agent is present in the composition in an amount in the range of from about 0.1% to about 0.25% by weight of cement therein.

34. The method of claim 11 wherein the location to be cemented is above ground, below ground or in a well.

35. A method of cementing comprising the steps of:
preparing a heavy weight cement composition that comprises Portland hydraulic cement, optionally a crystalline silica strength retrogration preventer, iron oxide or manganese oxide weighting material, sodium chloride weighting material, a graft lignite copolymer fluid loss additive, a dispersant comprising a sulfonated acetone-formaldehyde condensate or the sodium salt of naphthalene sulfonate condensed with formaldehyde, a copolymer of acrylic acid and 2-acrylamido-2-methyl propane sulfonic acid set retarder, a tartaric acid set retarder, sufficient water to form a slurry, and a suspending agent comprising boron treated low molecular weight dry ground guar splits;
pumping the heavy weight cement composition into the annular space between a well bore and a pipe string disposed therein; and
allowing the cement composition to set therein.

36. The method of claim 35 wherein the crystalline silica strength retrogression preventer is present in the composition in an amount in the range of from about 35% to about 70% by weight of cement therein.

37. The method of claim 35 wherein the iron oxide or manganese oxide weighting material is present in the composition in an amount in the range of from about 35% to about 60% by weight of cement therein.

38. The method claim 35 wherein the sodium chloride weighting material is present in the composition in an amount in the range of from about 15% to about 25% by weight of cement therein.

39. The method of claim 35 wherein the graft lignite copolymer fluid loss additive is present in the composition in an amount in the range of from about 0.5% to about 2% by weight of cement therein.

40. The method of claim 35 wherein the dispersant is present in the composition in an amount in the range of from about 0.25% to about 5% by weight of cement therein.

41. The method of claim 35 wherein the copolymer of acrylic acid and 2-acrylamid-2-methyl propane sulfonic acid set retarder is present in the composition in an amount in the range of from about 0.1% to about 2% by weight of cement therein.

42. The method of claim 35 wherein the tartaric acid set retarder is present in the composition in an amount in the range of from about 0.1% to about 0.75% by weight of cement therein.

43. The method of claim 35 wherein the water is present in the composition in an amount in the range of from about 30% to about 70% by weight of cement therein.

44. The method of claim 35 wherein the boron treated low molecular weight dry ground guar splits suspending agent is present in the composition in an amount in the range of from about 0.1% to about 0.25% by weight of cement therein.

45. A cement composition comprising:
hydraulic cement;
water; and
a suspending agent comprising boron treated low molecular weight dry ground guar splits.

46. The cement composition of claim 45 wherein the hydraulic cement is Portland cement, pozzolana cement, gypsum cement, aluminum cement, silica cement or high alkalinity cement.

47. The cement composition of claim 45 wherein the hydraulic cement is Portland cement.

48. The cement composition of claim 45 wherein the water is fresh water or salt water.

49. The cement composition of claim 45 wherein the water is present in an amount sufficient to form a slurry.

50. The cement composition of claim 45 wherein the boron treated low molecular weight dry ground guar splits suspending agent has a molecular weight in the range of from about 500 to about 700.

51. The cement composition of claim 45 wherein the boron treated low molecular weight dry ground guar splits suspending agent has a viscosity in a 1% by weight aqueous solution of about 20 to 30 centipoises.

52. The cement composition of claim 45 wherein the boron treated low molecular weight dry ground guar splits suspending agent is present in the composition in an amount in the range of from about 0.1% to about 0.25% by weight of cement therein.

53. The cement composition of claim 45 wherein the boron treated low molecular weight dry ground guar splits suspending agent when added to water does not hydrate until a temperature of about 200° F. is reached.

54. The cement composition of claim 45 wherein the composition comprises at least one of a strength retrogression preventer, a weighting material, a fluid loss additive, a dispersant, and a set retarder.

55. A cement composition comprising:
hydraulic cement;
optionally, a strength retrogration preventer weighting material;
a fluid loss additive;
a dispersant;
a set retarder;
water; and
a suspending agent comprising boron treated low molecular weight dry ground guar splits.

56. The cement composition of claim 55 wherein the hydraulic cement is Portland cement, pozzolana cement, gypsum cement, aluminum cement, silica cement or high alkalinity cement.

57. The cement composition of claim 55 wherein the hydraulic cement is Portland cement.

58. The cement composition of claim 55 wherein the optional strength retrogration preventer is crystalline silica.

59. The cement composition of claim 55 wherein when included the strength retrogration preventer is present in the composition in an amount in the range of from about 35% to about 70% by weight of cement therein.

60. The cement composition of claim 55 wherein the weighting material is iron oxide, manganese oxide or sodium chloride.

61. The cement composition of claim 55 wherein the weighting material is iron oxide or manganese oxide and sodium chloride.

62. The cement composition of claim 61 wherein the iron oxide or manganese oxide weighting material is present in the composition in an amount in the range of from about 35% to about 60% by weight of cement therein.

63. The cement composition of claim 61 wherein the sodium chloride weighting material is present in the composition in an amount in the range of from about 15% to about 25% by weight of cement therein.

64. The cement composition of claim 55 wherein the fluid loss additive is a graft lignin or lignite copolymer.

65. The cement composition of claim 55 wherein the fluid loss additive is a graft lignite copolymer.

66. The cement composition of claim 55 wherein the fluid loss additive is present in the composition in an amount in the range of from about 0.5% to about 2% by weight of cement therein.

67. The cement composition of claim 55 wherein the dispersant is a sulfonated acetone-formaldehyde condensate or the sodium salt of naphthalene sulfonate condensed with formaldehyde.

68. The cement composition of claim 55 wherein the dispersant is a sulfonated acetone-formaldehyde condensate.

69. The cement composition of claim 55 wherein the dispersant is present in the composition in an amount in the range of from about 0.25% to about 5% by weight of cement therein.

70. The cement composition of claim 55 wherein the set retarder is a copolymer of acrylic acid and 2-acrylamido-2-methyl propane sulfonic acid.

71. The cement composition of claim 70 wherein the copolymer of acrylic acid and 2-acrylamido-2-methyl propane sulfonic acid set retarder is present in the composition in an amount in the range of from about 0.1% to about 2% by weight of cement therein.

72. The cement composition of claim 55 wherein the set retarder is tartaric acid.

73. The cement composition of claim 72 wherein the tartaric acid set retarder is present in the composition in an amount in the range of from about 0.1% to about 0.75% by weight of cement therein.

74. The cement composition of claim 55 wherein the water is fresh water or salt water.

75. The cement composition of claim 55 wherein the water is present in an amount sufficient to form a slurry.

76. The cement composition of claim 55 wherein the boron treated low molecular weight dry ground guar splits suspending agent has a molecular weight in the range of from about 500 to about 700 and a viscosity in a 1% by weight aqueous solution of about 20 to 30 centipoises.

77. The cement composition of claim 55 wherein the boron treated low molecular weight dry ground guar splits suspending agent is present in the composition in an amount in the range of from about 0.1% to about 0.25% by weight of cement therein.

78. A heavy weight cement composition comprising:
Portland cement;
crystalline silica strength retrogration preventer;
iron oxide weighting material;
sodium chloride weighting material;
a graft lignite copolymer fluid loss additive;
a dispersant comprising a sulfonated acetone-formaldehyde condensate or a mixture of polyvinylpyrrolidone and the sodium salt of naphthalene sulfonate condensed with formaldehyde;
a copolymer of acrylic acid and 2-acrylamido-2-methyl propane sulfonic acid set retarder;
a tartaric acid set retarder;
sufficient water to form a slurry; and
a suspending agent comprising boron treated low molecular weight dry ground guar splits.

79. The cement composition of claim 78 wherein the crystalline silica strength retrogression preventer is present in the composition in an amount in the range of from about 35% to about 70% by weight of cement therein.

80. The cement composition of claim 78 wherein the iron oxide or manganese oxide weighting material is present in the composition in an amount in the range of from about 35% to about 60% by weight of cement therein.

81. The cement composition of claim 78 wherein the sodium chloride weighting material is present in the composition in an amount in the range of from about 15% to about 25% by weight of cement therein.

82. The cement composition of claim 78 wherein the graft lignite copolymer fluid loss additive is present in the composition in an amount in the range of from about 0.5% to about 2% by weight of cement therein.

83. The cement composition of claim 78 wherein the dispersant is present in the composition in an amount in the range of from about 0.25% to about 5% by weight of cement therein.

84. The cement composition of claim 78 wherein the copolymer of acrylic acid and 2-acrylamid-2-methyl propane sulfonic acid set retarder is present in the composition in an amount in the range of from about 0.1% to about 2% by weight of cement therein.

85. The cement composition of claim 78 wherein the tartaric acid set retarder is present in the composition in an amount in the range of from about 0.1% to about 0.75% by weight of cement therein.

86. The cement composition of claim 78 wherein the water is present in the composition in an amount sufficient to form a slurry.

87. The cement composition of claim 78 wherein the boron treated low molecular weight dry ground guar splits suspending agent is present in the composition in an amount in the range of from about 0.1% to about 0.25% by weight of cement therein.

88. A suspending agent comprising boron treated low molecular weight dry ground guar splits.

89. The suspending agent of claim 88 wherein the agent has a molecular weight in the range of from about 500 to about 700.

90. The suspending agent of claim 88 wherein the agent has a viscosity in a 1% by weight aqueous solution of about 20 to 30 centipoises.

91. The suspending agent of claim 88 wherein the agent when added to water does not hydrate until a temperature of about 200° F. is reached.

92. A cement composition suspending agent comprising boron treated low molecular weight dry ground guar splits.

93. The cement composition suspending agent of claim 92 wherein the agent has a molecular weight in the range of from about 500 to about 700.

94. The cement composition suspending agent of claim 93 wherein the agent has a viscosity in a 1% by weight aqueous solution of about 20 to 30 centipoises.

95. The cement composition suspending agent of claim 93 wherein the agent when added to water does not hydrate until a temperature of about 200° F. is reached.

* * * * *